United States Patent

Crist

[15] 3,648,266

[45] Mar. 7, 1972

[54] ELECTRIC FENCE SHORT DETECTOR

[72] Inventor: Vernon W. Crist, Wessington Springs, S. Dak. 91356

[22] Filed: Apr. 17, 1970

[21] Appl. No.: 29,591

[52] U.S. Cl.........................340/254, 335/273, 340/255
[51] Int. Cl........................................G08b 21/00
[58] Field of Search...............340/254, 255, 253; 335/273, 335/90

[56] References Cited

UNITED STATES PATENTS

| 768,288 | 8/1904 | Kelly | 335/90 |
| 2,318,359 | 5/1943 | Bellows | 335/273 |
| Re 19,922 | 4/1936 | Gengler | 340/254 X |
| 405,572 | 6/1889 | Loomis | 340/255 |

FOREIGN PATENTS OR APPLICATIONS

| 252,314 | 12/1947 | Switzerland | 340/254 |

*Primary Examiner*—David L. Trafton
*Attorney*—Henderson & Strom

[57] ABSTRACT

An apparatus to be used in conjunction with an electric fence, whereby when the fence is shorted, a current impulse is provided in a coil in the apparatus which causes a core to be magnetized to attract an armature, thus completing an internal circuit and activating an indicator device.

5 Claims, 4 Drawing Figures

Patented March 7, 1972 3,648,266
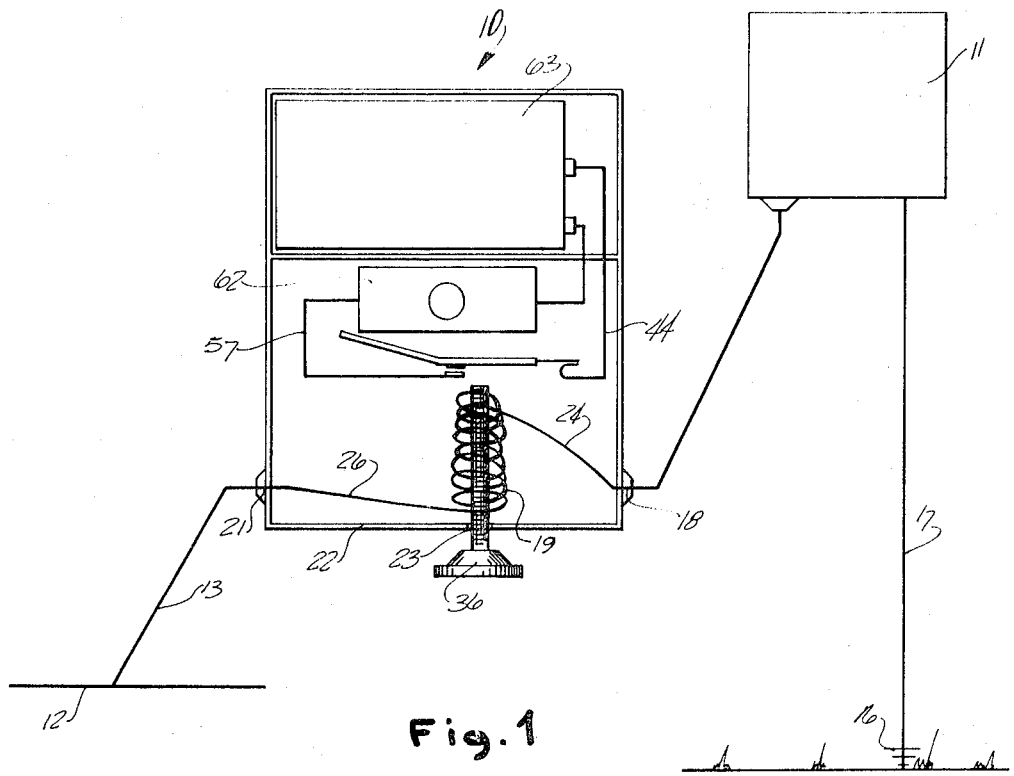
Fig. 1
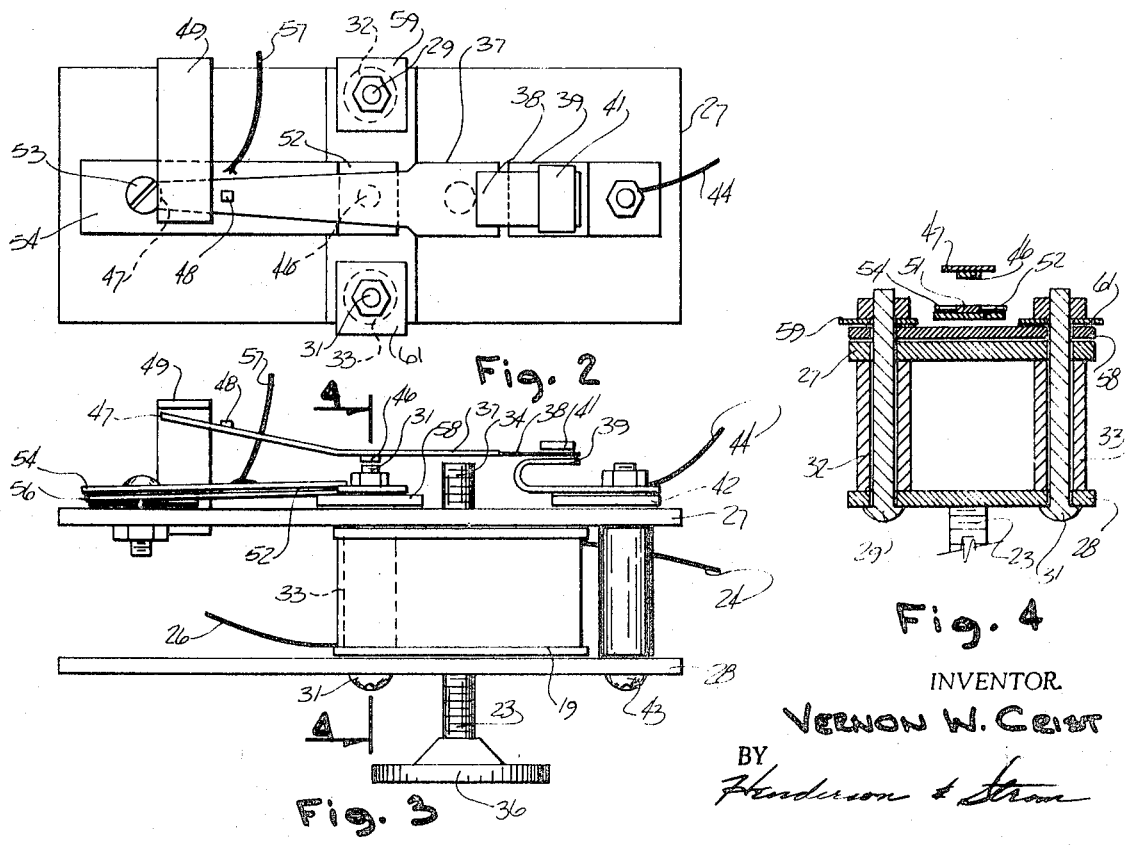
Fig. 2
Fig. 3
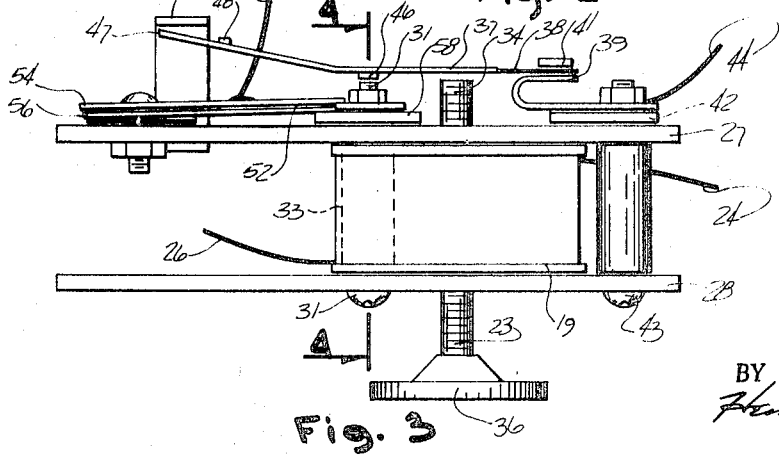
Fig. 4
INVENTOR.
VERNON W. CRIST
BY
Henderson & Strom
ATTORNEYS

ELECTRIC FENCE SHORT DETECTOR

BACKGROUND OF THE INVENTION

The practice of charging a wire fence with a voltage source for the purpose of containing livestock has become common procedure, the principal reasons being the ease with which a fence may be erected and the economical factors involved.

The effectiveness, however, of an electrical fence is reduced and may be completely dispelled by a short or a grounding of the wire caused by faulty insulators, weeds, or foreign objects making contact with the wire. Thus it is necessary that there be a method of checking and detecting any undesired groundings so that corrective measures may be taken.

Early indicators included current responsive lamps or meters which proved to be unreliable because of the fence-to-ground capacity, varying weather conditions and the difficulty in adapting the system to the particular fence to be monitored. Later indicators were of the voltage responsive type consisting of a bank of neon glow lamps used in conjunction with resistors, a system that also has proven to be inadequate under certain circumstances. For example, the brightness of the neon glow light in present day fence testers will vary with the length of wire fence and type of fence charger used.

SUMMARY OF THE INVENTION

The need, therefore, has been shown for an indicator system which can easily be adapted to a particular electric fence to be monitored; a system which is adjustable for the degree of sensitivity desired; and a system which is economical to manufacture and operate, while still reliably performing its function of monitoring. This invention provides an easy adjustment for the length of fence and type of fence charger, so that an extremely accurate check for the degree of short is possible.

The subject invention allows for a livestock owner to place in a conspicuous place an indicator which will constantly monitor an electric fence, the indicator being activated only when the fence is grounded, thus signalling that the system needs attention. By simply adjusting the instrument, the operator can choose the desired sensitivity. For instance, it may be set so that it will indicate the slightest grounding caused by a weed, or it may be set to activate only upon a total grounding caused by a break in a fence wire.

This invention employs a coil connected in series to a wire fence to be monitored, the coil causing an insulated internal core to be magnetized when the current in the coil is increased by a short in the fence, thus attracting an armature which engages a contact point, thereby completing a circuit and activating an indicator.

An object of this invention is to provide an electric fence short detector.

Another object of this invention is the provision of a short detector for an electrically charged circuit wherein the sensitivity of the detector can be adjusted.

A further object of this invention is to provide a short detector for an electric fence which is activated by a change in the flow of current through the fence.

Yet another object of this invention is the provision of a cushioning means under the contact points of a short detector, thus preventing a bounce-back effect between the contacts and enabling the detector to signal a change of current or short in the system to be monitored.

A still further object of this invention is to provide a short detector for an electric fence which will indicate partial shorts; that is, when merely a green weed contacts the fence, the detector will signal an alarm even though the electric fence will still give a high-intensity shock.

Still another object of this invention is the provision of a short detector for an electric fence which will detect cracked insulators, excessive weed growth or any other minor short in the fence.

Yet another object of the short detector of this invention is to provide a detector which is extremely effective in use; compact, rugged, and simple of construction; economical of construction and sensitive in the detection of minor shorts and major shorts in the system monitored.

These objects and other features and advantages of this invention will become more readily apparent upon reference to the following description when taken in conjunction with the accompanying drawings.

BRIEF DESCRIPTION OF THE DRAWINGS

FIG. 1 is a schematic of the preferred embodiment, as installed with an electric fence.

FIG. 2 is a top view of the device absent the circuits.

FIG. 3 is a front view of the device.

FIG. 4 is a sectional view of the device as seen from lines 4—4 in FIG. 3.

DESCRIPTION OF THE PREFERRED EMBODIMENT

Referring now to the drawings, the apparatus 10 (FIG. 1) is designed to be used in conjunction with an electrical power source 11 which supplies current to a bare wire fence 12 of one or more wires. The circuit comprises an electrical power source 11 connected to ground 16 by ground wire 17, an inlet wire 14 leading from the power source 11 to the inlet terminal 18 of the apparatus 10, a coil 19 disposed in the apparatus 10 and electrically connected to the inlet terminal 18 and the outlet terminal 21, and an outlet wire leading from the outlet terminal 21 to the fence 12. The portion of the circuit which will be monitored by the apparatus 10 includes the inlet 14 and outlet 13 wires as well as the fence 12.

The apparatus 10 is contained in a rectangular box 22 which is preferably antimagnetic and weather-proof, such as plastic. The inlet terminal 18, and the outlet terminal 21 are electrically insulated from the box 10 and are electrically connected to the coil 19 at coil ends 24 and 26 respectively, as shown in FIG. 3. The coil 19 is mounted between two parallel housing plates 27 and 28 and secured by bolts 29 and 31 (FIG. 4) passing through and normal to the plates. Cylindrical spacers 32 and 33 are disposed around the bolts 29 and 31 respectively to maintain the separation between the plates 27 and 28.

Disposed longitudinally within, but not making contact with the coil 19 is an iron core 23 (FIG. 3) which is threadably secured through and normal to the housing plates 27 and 28, the core having one end 34 protruding through plate 27 and having the other end protruding through plate 29 with a handle 36 secured thereon. The length that protrudes at end 34 is adjustable by turning the core handle 36 which is located outside the box 22 as shown in FIG. 1.

Disposed normally to and separated by a short gap from the core end 34 (FIG. 3) is an armature 37 which is of a material that is magnetically attractable. The armature 37 is a flat metal member having its longitudinal edges turned upward to form reinforcing edges thereon. At one end of the armature 37 is secured a flat metal spring 38 which in turn is secured to a U-shaped spring base 39 by a flat metal anchor 41. The spring 38 and anchor may be secured by soldering, welding, or any other suitable means. The spring base 39, having one end secured to the spring 38, has its other end resting on a pad 42 contiguous with the plate 27 and is secured by a bolt 43 passing normally through plates 27 and 28, the pad 42 and the spring base 39. Also secured to the spring base is an electrical wire 44 which is part of the internal circuit of the apparatus.

The armature 37 (FIG. 3) has a contact point 46 secured thereto on its lower surface proximate its midpoint that is formed from an electrical conductor material. Extending from this point, the armature angles upward to its other end 47, having a weight 48 secured to its upper surface proximate its end 47 and having an arm 49 disposed above and contiguous to it, thereby limiting its upward movement. The arm 49 is secured to the under side of the plate 27.

Located directly below, but not touching the contact point 46 (FIG. 3) is a contact point 51 which is secured to one end of a substantially horizontal thin metal leaf spring 52. The leaf spring 52 is secured at its other end by a bolt 53 with a stiffener 54 secured directly above and contiguous to it, and a pad 56 directly under it, with all three secured to the plate 28 by the bolt 53. A wire 57 is electrically connected to the stiffener and is part of the internal circuit of the apparatus.

Directly below the leaf spring 52, and in line with the two contacts 46 and 51 is a shock absorber 58 which is secured to the plate 27 by bolts 29 and 31 and held in place by washers 59 and 61 (FIG. 2). The shock absorber is made of a resilient material and is a nonconductor of electricity.

The internal circuit of the apparatus comprises a wire 57 (FIG. 1) connected in series with an indicator 62, the indicator being an audible signal, a lamp, or the like; a power source 63, such as a dry cell battery; and a wire 44. The internal circuit is completed so as to activate the indicator 62 whenever the contacts 46 and 51 (FIG. 3) are engaged, thereby allowing the current to flow from the wire 44 through the spring base 39, the spring 38, the armature 37, the points 46 and 51, the leaf spring 52 and the stiffener 54, to the wire 57.

The internal circuit is completed by a short in the fence wire 12 in the following manner: Whenever a short occurs in a wire 12, a surge of current is caused to flow in the external circuit of which the coil 19 is a part. The increase in current through the coil 19 produces a magnetic flux which magnetizes the iron core 23 thus causing the armature 37 to be attracted toward the core whereby the contact points 46 and 51 are engaged and the circuit is completed.

The separation between the core end 34 (FIG. 3) and the armature 37 can be adjusted by merely turning handle 36. As the distance is increased, a greater current will be required to attract the armature 37 and in this way the sensitivity of the instrument may be adjusted.

As the sudden surge attracts the armature 37, it is necessary that the weight 48 be attached to give the armature the required momentum to engage the contacts 46 and 51. Upon engaging, contact 46 would bounce off contact 51, thus breaking the internal circuit, except for the shock absorber 58 which cushions the engagement. The stiffener 54, or contact resistor, acts to hold the leaf spring 52 lightly against the shock absorber 58 and to prevent accidental engagement of the contacts 46 and 51.

To set the short detector for accuracy in the degree of short that it will indicate, the fence wire is first purposely grounded, for example by a wire between the ground and the fence. The core handle 36 is manually turned to vary the distance of the gap between the core and armature until the brightness of the lamp is at a maximum. The core handle is then again adjusted to enlarge the gap as much as possible without reducing the intensity of the lamp. The adjustment will vary depending upon the length of the fence and the type of charger used. After the gap has been adjusted, the grounding wire is removed and the detector is ready for operation. If the fence becomes grounded, the lamp will flash brightly; however, if only a partial ground occurs, for example weeds contacting the wire during damp weather, less magnetic flux is created with less movement of the core which results in a shorter and less firm contact between the contact points. A less firm contact will product a dimmer light intensity in the signal lamp.

The usefulness of this device to the farmer or stockman now becomes apparent. After he has installed the short detector at some conspicuous location, he does not have the regular chore of checking his electric fence for shorts. When he notices a bright flashing signal, he knows that the fence is shorted out and needs immediate attention. When the light is dim during damp weather, he knows the fence is only partially shorted and there is still shock on the wire. However, when the dim light persists after the weather conditions become dry, he knows there is current leakage through cracked insulators, excessive weed growth against the wire, or the fence wire may be partially down and lightly touching the ground.

I claim:

1. An electric fence short detector for detecting a short in an electric circuit connected to a source of power, said short detector comprising:
   housing means;
   a coil disposed in said housing means, said coil electrically connected in series between the power source and the electric circuit;
   a magnetizable core adjustably disposed longitudinally within and insulated from said coil, said core adjustably secured to and insulated from said housing means with one end thereof projecting outwardly of said coil;
   a magnetically attractable armature means capable of conducting electricity mounted in said housing means, said armature means including a U-shaped spring having one leg thereof secured to said housing means and disposed normally to said core with the base thereof spaced from said core and having the free end of the other leg thereof projecting away from said core, a flat member secured to said spring other leg and having a free end projecting beyond and over said core one end with said flat member insulated from said housing and disposed substantially normal to said core one end; and an armature contact point secured to said flat member and spaced from said first contact point when said flat member is in a normal position;
   a first contact point disposed in said housing means adjacent said armature means;
   said flat member pivotable from said normal position to a second position wherein said first contact point engages said armature contact point;
   conductor means electrically connected to said first contact point; and
   an internal circuit having a power means and an indicator means electrically connected in series, said internal circuit connected on one end to said conductor means and on the other end to said conductor means and on the other end to said armature means wherein, when a short occurs in the electric circuit, a magnetic flux is created by said coil thereby magnetizing said core, said magnetized core causing said flat member to pivot to said second position, thus closing said internal circuit and activating said indicator means.

2. The short detector as defined in claim 1 wherein said flat member has a weight secured to its free end for the purposes of increasing the pivoting movement of said flat member when said core is magnetized.

3. The short detector as defined in claim 2 wherein a strap is secured to said housing means which extends adjacent said flat member free end to restrict its movement.

4. The short detector as defined in claim 3 wherein said conductor means is a leaf spring secured on one end to said housing means and insulated therefrom and having the other end thereof secured to said first contact means and disposed immediately above said housing means.

5. A short detector as defined in claim 4 and including a cushioning means secured between said housing means and said leaf spring means other end thus dampening the vibration of said leaf spring.

* * * * *